United States Patent
Williams

(10) Patent No.: US 8,690,365 B1
(45) Date of Patent: Apr. 8, 2014

(54) AUTOMOBILE REFLECTIVE SURVEILLANCE SYSTEM

(76) Inventor: Laurie A. Williams, Homestead, FL (US)

( * ) Notice: Subject to any disclaimer, the term of this patent is extended or adjusted under 35 U.S.C. 154(b) by 85 days.

(21) Appl. No.: 13/436,281

(22) Filed: Mar. 30, 2012

(51) Int. Cl.
*G02B 5/08* (2006.01)

(52) U.S. Cl.
USPC .......................................... 359/850; 359/870

(58) Field of Classification Search
USPC .......... 359/843, 844, 850, 870; 362/493, 494, 362/497, 505
See application file for complete search history.

(56) References Cited

U.S. PATENT DOCUMENTS

| | | | |
|---|---|---|---|
| 4,919,529 A | 4/1990 | Hyun | |
| 5,886,838 A * | 3/1999 | Kuramoto | 359/841 |
| 6,059,418 A * | 5/2000 | Edwards | 359/857 |
| 6,880,941 B2 * | 4/2005 | Suggs | 359/843 |
| 7,121,700 B1 * | 10/2006 | Scanlon | 362/493 |
| 7,866,835 B2 | 1/2011 | Liu | |
| 7,959,309 B2 | 6/2011 | Englander | |
| 2003/0107826 A1 * | 6/2003 | Shafrir et al. | 359/841 |
| 2004/0042099 A1 | 3/2004 | Libby et al. | |
| 2006/0132940 A1 * | 6/2006 | MacDougall | 359/843 |
| 2006/0181790 A1 * | 8/2006 | Jones | 359/843 |
| 2007/0263301 A1 * | 11/2007 | Agrest | 359/843 |

* cited by examiner

*Primary Examiner* — Frank Font

(57) ABSTRACT

An automobile reflective surveillance system including a plurality of mirrors configured to be installable on the exterior of an extant vehicle whereby a law enforcement officer may maintain a rearward line of sight when returning to said vehicle following a roadside stop.

4 Claims, 3 Drawing Sheets

AUTOMOBILE REFLECTIVE SURVEILLANCE SYSTEM

BACKGROUND OF THE INVENTION

Figure 1:
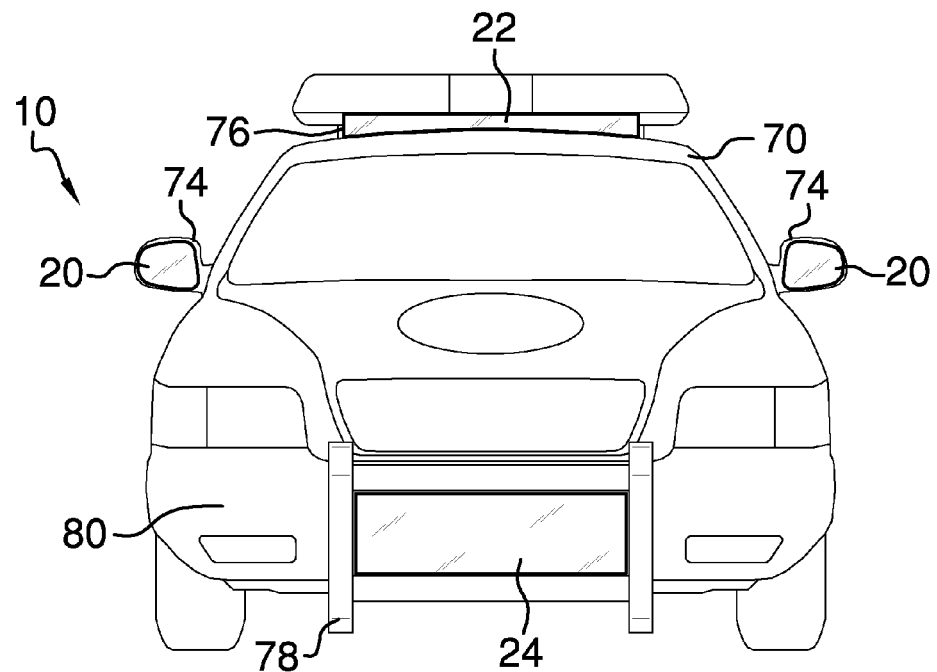

Various types of automobile reflective surveillance systems are known in the prior art. However, what is needed is an automobile reflective surveillance system that includes a plurality of mirrors configured to be installable on the exterior of an extant vehicle whereby a law enforcement officer may maintain a rearward line of sight when returning to said vehicle following a roadside stop

FIELD OF THE INVENTION

The present invention relates to an automobile reflective surveillance system, and more particularly, to an automobile reflective surveillance system including a plurality of mirrors configured to be installable on the exterior of an extant vehicle whereby a law enforcement officer may maintain a rearward line of sight when returning to said vehicle following a roadside stop

SUMMARY OF THE INVENTION

The general purpose of the automobile reflective surveillance system, described subsequently in greater detail, is to provide an automobile reflective surveillance system which has many novel features that result in an automobile reflective surveillance system which is not anticipated, rendered obvious, suggested, or even implied by prior art, either alone or in combination thereof.

The present automobile reflective surveillance system has been devised to assist the safety of law enforcement officers in the field. After pulling a perpetrator over, a law enforcement officer is most vulnerable when returning to the law enforcement vehicle to verify the identity of the perpetrator. When returning to the law enforcement vehicle, a law enforcement officer must turn their back on the perpetrator. However, law enforcement officers are taught to remain, as best possible, aware of said perpetrator. Maintaining awareness of the perpetrator and remaining sensible of traffic proximal the roadside can be difficult. The present invention, therefore, enables a law enforcement officer to maintain a rearward line of sight while returning to the law enforcement vehicle.

The instant automobile reflective surveillance system, therefore, includes a plurality of mirrors configured to be installed on an extant vehicle. The plurality of mirrors comprises reflective surfaces individually configured for mounting on a vehicle. The plurality of mirrors includes a pair of reverse mirrors configured to be installable to an extant pair of wing mirrors. The pair of reverse mirrors are configured to overlie the exterior and front-facing side of each wing mirror. Each of the pair of reverse mirrors therefore is disposed on the wing mirror and extends laterally from the vehicle. A law enforcement officer is enabled to maintain a rearward line of sight thereby when walking to the law enforcement vehicle and approaching said vehicle from the front of said vehicle. In the preferred embodiment herein disclosed, each of the pair of reverse mirrors is a divergent mirror. A larger field of view is therefore visible in the mirror.

A top mirror is included. The top mirror is configured to be installed on a light bar of a law enforcement vehicle, the light bar disposed atop the vehicle wherein the police lights are attached. The top mirror is a substantially parallelepiped mirror disposed between the police lights and the roof of the vehicle. The top mirror is disposed facing the front of the vehicle so that a law enforcement officer returning to said vehicle following a roadside stop is able to maintain a rearward line of sight within the top mirror.

A front mirror is also included, the front mirror configured to be installed upon an extant push bar disposed on the front bumper of the vehicle. The front mirror is a substantially parallelepiped mirror and increases the area of the field of view a law enforcement officer is enabled to see rearwards when returning to the law enforcement vehicle.

Each of the plurality of mirrors is manufactured to have a low glare and be shatter resistant. Each of the plurality of mirrors may have a film overlying the glass to tint the mirror to avoid dazzling oncoming traffic at nighttime. An embodiment is considered wherein the front mirror is rotatably mounted to the push bar, whereby the front mirror may be tilted into position by the law enforcement officer previous to approaching the perpetrator. Moreover, the top mirror may also be moveably disposed upon the light bar and thereby moveable between an in use position, wherein the mirror is exposed, and a stored position, wherein the mirror is covered, turned horizontal, stowed beneath the lights, or otherwise disposed facing away from the road. Additionally, each of the pair of reverse mirrors may have a covering wherein the reflective surface is covered until revealed by a law enforcement officer previous to approaching a perpetrator.

It should be noted that the plurality of mirrors as disclosed may be used with each of the plurality of mirrors as abovementioned separately, or in combination, as desired. Furthermore, applications wherein the mirrors are disposed on the rear of the law enforcement vehicle are contemplated.

Thus has been broadly outlined the more important features of the present automobile reflective surveillance system so that the detailed description thereof that follows may be better understood and in order that the present contribution to the art may be better appreciated.

Objects of the present automobile reflective surveillance system, along with various novel features that characterize the invention are particularly pointed out in the claims forming a part of this disclosure. For better understanding of the automobile reflective surveillance system, its operating advantages and specific objects attained by its uses, refer to the accompanying drawings and description.

BRIEF DESCRIPTION OF THE DRAWINGS FIGURES

Figure 2:
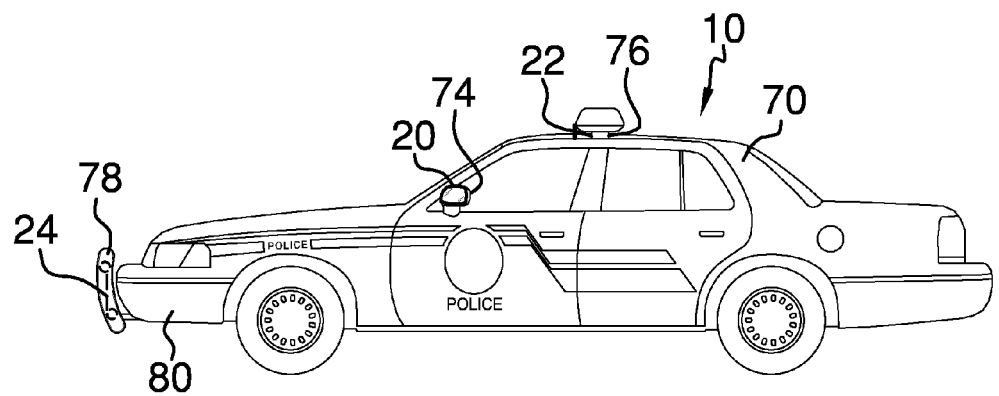
Figure 3:
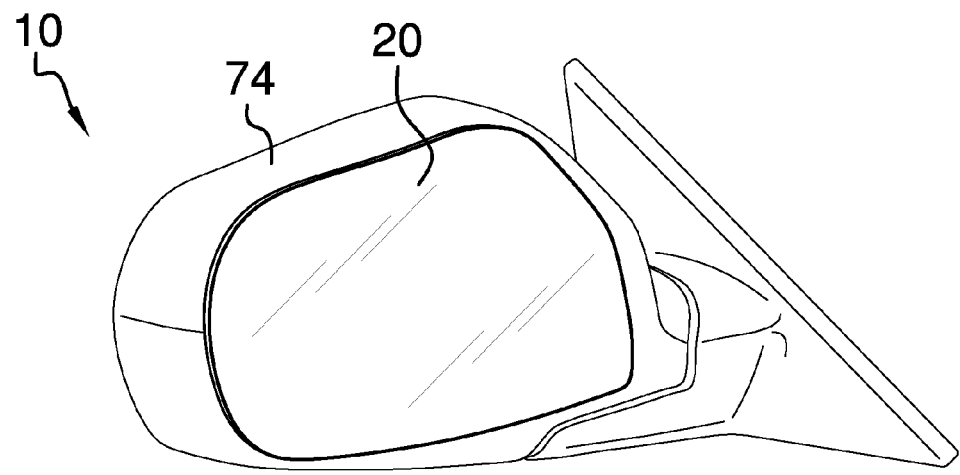
Figure 4:
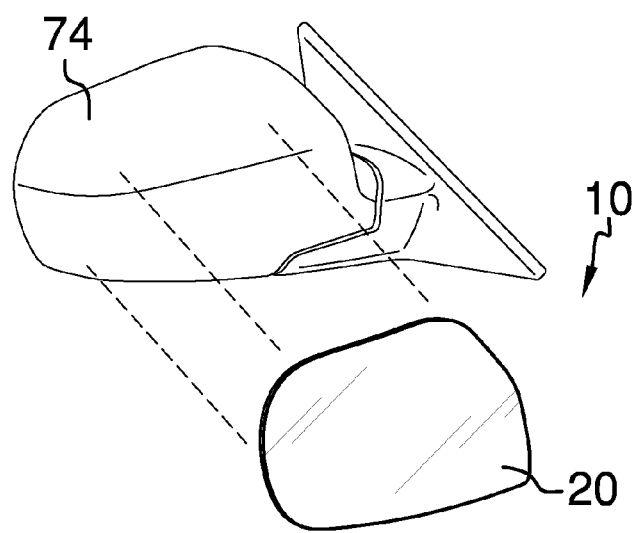
Figure 5:
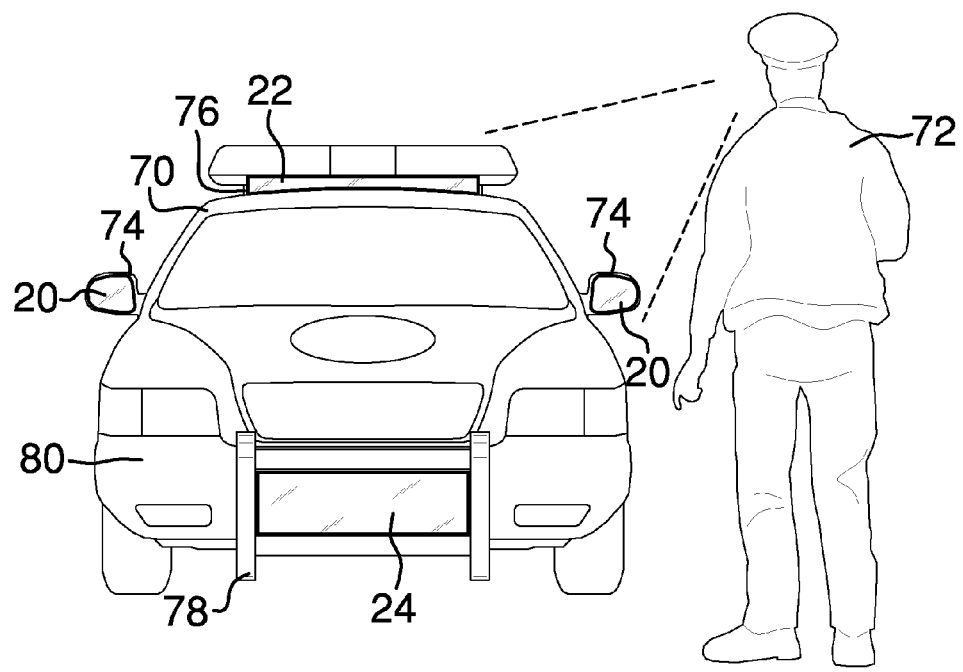
Figure 6:
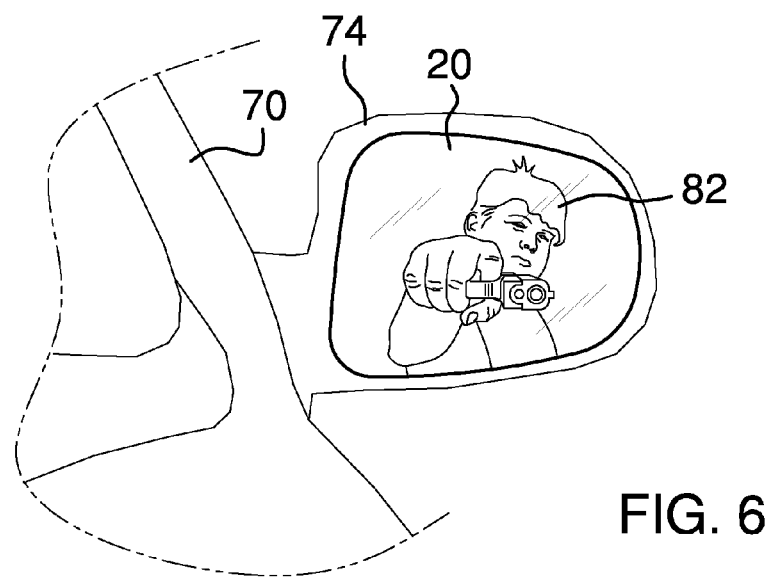

FIG. 1 is a front view.
FIG. 2 is a side view.
FIG. 3 is an isometric view of one of a pair of reverse mirrors.
FIG. 4 is an exploded view of one of a pair of reverse mirrors.
FIG. 5 is an in-use view.
FIG. 6 is a detail view.

DETAILED DESCRIPTION OF THE DRAWINGS

With reference now to the drawings, and in particular FIGS. 1 through 6 thereof, example of the instant automobile reflective surveillance system employing the principles and concepts of the present automobile reflective surveillance system and generally designated by the reference number 10 will be described.

Referring to FIGS. 1 through 6 a preferred embodiment of the present automobile reflective surveillance system 10 is illustrated.

The automobile reflective surveillance system 10 includes a plurality of mirrors installable to an extant vehicle 70, the plurality of mirrors enabling rearward viewing for a law enforcement officer 72 returning to said vehicle 70 when outside the vehicle 70.

The plurality of mirrors include a pair of reverse mirrors 20 configured to be installable upon extant wing mirrors 74 on a vehicle 70, each of the pair of reverse mirrors 20 disposed facing forwards relative the vehicle 70, a top mirror 22 configured to be installable upon an extant light bar 76 disposed atop the vehicle 70, and a front mirror 24 configured to be installable upon an extant push bar 78 disposed upon the front bumper 80 of the vehicle 70.

Each of said plurality of mirrors is configured to be low-glare and shatter resistant, and a law enforcement officer 72 thereby remains sensible of objects behind said law enforcement officer 72 when the law enforcement officer 72 is approaching the front of said vehicle 70. The pair of reverse mirrors 20 are contemplated to be divergent mirrors, enabling an extended field of view. The top mirror 22 and the front mirror 24 may also be divergent mirrors to provide an extended field of view.

After enforcing a traffic stop, the law enforcement officer 72 is most vulnerable when returning to the law enforcement vehicle 70 after identifying a perpetrator 82. In order to return to the vehicle 70, the law enforcement officer 72 must necessarily turn their back to the perpetrator 82. Keeping aware and sensible of the perpetrator 82 while remaining sensible of traffic proximal the roadside is difficult, and many a law enforcement officer 72 has lost their life on a simple roadside stop.

The present invention 10 therefore enables a law enforcement officer 72 to remain sensible of a rearward field of view when returning to their vehicle, from multiple perspectives, while their back is turned on the perpetrator 82. Should the perpetrator 82 seek to exit their vehicle, or present a weapon aimed at said law enforcement officer 72, the law enforcement officer 72, alerted to the movements of the perpetrator 82, can take preemptive action.

What is claimed is:

1. An automobile reflective surveillance system comprising a plurality of mirrors installable to an extant vehicle, the plurality of mirrors further comprising at least one of:
    a pair of reverse mirrors configured to be installable upon extant wing mirrors on a vehicle, each of the pair of reverse mirrors disposed facing forwards relative the vehicle;
    a top mirror configured to be installable upon an extant light bar disposed atop a law enforcement vehicle;
    a front mirror configured to be installable upon an extant push bar disposed upon the front bumper of a law enforcement vehicle;
    wherein a law enforcement officer is sensible of objects behind said law enforcement officer when approaching the front of said vehicle.

2. The automobile reflective surveillance system of claim 1 wherein the plurality of mirrors are low-glare mirrors.

3. The automobile reflective surveillance system of claim 2 wherein the plurality of mirrors are shatter resistant mirrors.

4. An automobile reflective surveillance system comprising a plurality of mirrors installable to an extant vehicle, the plurality of mirrors further comprising:
    a pair of reverse mirrors configured to be installable upon extant wing mirrors on a vehicle, each of the pair of reverse mirrors disposed facing forwards relative the vehicle;
    a top mirror configured to be installable upon an extant light bar disposed atop a law enforcement vehicle;
    a front mirror configured to be installable upon an extant push bar disposed upon the front bumper of a law enforcement vehicle;
    wherein each of said plurality of mirrors is low-glare and shatter resistant, whereby a law enforcement officer is sensible of objects behind said law enforcement officer when approaching the front of said vehicle.

* * * * *